United States Patent
Yamaguchi et al.

[11] Patent Number: 5,880,804
[45] Date of Patent: Mar. 9, 1999

[54] PROCESS FOR PRODUCING FERROELECTRIC LIQUID CRYSTAL DEVICE

[75] Inventors: Hidemasa Yamaguchi, Sayama; Toshiaki Nonaka, Iruma; Kei Li, Higashikurume; Ayako Takeichi, Tokorozawa, all of Japan

[73] Assignee: Hoechst Aktiengesellschaft, Frankfurt, Germany

[21] Appl. No.: 629,582

[22] Filed: Apr. 9, 1996

[30] Foreign Application Priority Data

Apr. 10, 1995 [JP] Japan ................................ 7-109012

[51] Int. Cl.⁶ ........................................................ G02F 1/13
[52] U.S. Cl. ............................. 349/188; 349/184; 349/172
[58] Field of Search .................................... 349/188, 184, 349/172; 156/229

[56] References Cited

U.S. PATENT DOCUMENTS 4,973,373  11/1990  Hashimoto et al. .................... 156/229
5,078,477  1/1992  Jono et al. ............................. 349/188
5,124,827  6/1992  Davey .................................... 349/188

*Primary Examiner*—William L. Sikes
*Assistant Examiner*—Julie Ngo
*Attorney, Agent, or Firm*—Frommer Lawrence & Haug LLP

[57] ABSTRACT

An improved method for achieving a defect-free and uniform liquid crystal alignment in a process for the production of a ferroelectric liquid crystal display device. A process for producing a ferroelectric liquid crystal display device containing a ferroelectric liquid crystal showing at least an N* phase and an SmC* phase and an organic polymer film or an oblique vapor-deposition film of an inorganic substance serving as an alignment layer is provided by aligning the liquid crystal by cooling the liquid crystal once to a temperature region of a phase which resides in the lower temperature region than the N* phase, and then heating it to a temperature region of an N* phase, or by aligning the liquid crystal by applying an electric field in the N* phase.

12 Claims, 9 Drawing Sheets

PROCESS FOR PRODUCING FERROELECTRIC LIQUID CRYSTAL DEVICE

FIELD OF THE INVENTION

This invention relates to a process for producing a liquid crystal display device. More particularly, it relates to a process for producing a liquid crystal display device characterized in that a uniform and defect-free liquid crystal alignment can be obtained by heating to an N* phase, applying an electric field in the N* phase, or a combination thereof.

BACKGROUND OF THE INVENTION

In the past 10 years, liquid crystals have been introduced into various technical fields (for example, watch, electric calculator and typewriter displays) wherein the electrooptical properties and the characteristics of liquid crystals in a display device are required. These liquid crystal devices are based on the dielectric alignment effects of liquid crystal compounds in nematic, cholesteric or smectic phases. In such a liquid crystal phase, the long axis of a molecule of the compound is selectively aligned under the electric field applied thereon due to its dielectric anisotropy. The usual response time of a display device is too long to use in a number of other fields where liquid crystals can be applied. This problem is particularly serious when it is necessary to apply an electric field to a number of pixels. To solve this problem, it is effective to employ an active mode with the use of a thin film transistor (TFT). However, it generally costs too much to produce an instrument having a relatively large screen size.

In addition to nematic and cholesteric liquid crystals, the importance of optically active smectic liquid crystal phases has greatly increased in these several years.

Clark and Lagerwall demonstrated that an electrooptical switching or display device, which shows a response speed 1,000 times higher than that of a conventional twisted nematic (TN) cell, can be obtained by employing a ferroelectric liquid crystal system in an extremely thin cell [see, for example, Lagerwall et al., "Ferroelectric Liquid Crystal Displays", SID Symposium, October Meeting, 1985, San Diego, Calif., USA, hereby incorporated by reference]. Because of having these characteristics as well as other favorable properties including bistable switching, wide viewing angle characteristics and high contrast, ferroelectric liquid crystals (FLC) are principally suitable for the above-mentioned fields, for example, those wherein matrix addressing are employed.

Known methods for aligning ferroelectric liquid crystals include the rubbing method and the oblique vapor-deposition method. In the rubbing method, an organic polymer film is formed on a transparent electrode by spin coating or printing, and then the organic polymer film is rubbed by rotating a roller having an organic polymer cloth wound around the same to align liquid crystal molecules in the rubbing direction. Although this method is highly suitable for mass production, a panel obtained by this method has only a small pretilt angle (i.e., a liquid crystal alignment inclination angle to a substrate) of 0° to 10°.

When a larger pretilt angle is needed, the oblique vapor-deposition method is employed with the use of an inorganic substance such as SiO. By using this method, it is possible to overcome the problem of zigzag defects and to obtain a monodomain alignment having a large pretilt angle.

To obtain an alignment free from any defects, it is generally required to fill a liquid crystal into a cell prepared by one of the above-mentioned aligning methods or another method, and then gradually cool the cell as described in JP-B-6-64273, hereby incorporated by reference.

However, it is sometimes impossible to obtain a completely defect-free alignment by the above-mentioned method involving gradual cooling. Particularly when a rough interface is formed by the oblique vapor-deposition method or spacers are scattered on the surface, the unevenness on the surface of the alignment layer provides nuclei and thus disclination lines are formed in the nematic phase, or in some cases, twisted alignments exist. These defects in the nematic phase remain as such even in the smectic phase, thus deteriorating the display performance.

OBJECTS OF THE INVENTION

It is therefore required to establish an improved method for achieving a defect-free and uniform liquid crystal alignment.

SUMMARY OF THE INVENTION

The present invention provides a process for producing a ferroelectric liquid crystal display device containing a ferroelectric liquid crystal showing at least an N* phase and an SmC* phase and an organic polymer film or an oblique vapor-deposition film of an inorganic substance serving as an alignment layer, characterized by aligning the liquid crystal by cooling the liquid crystal once to a temperature region of a phase which resides in the lower temperature region than the N* phase, and then heating it to a temperature region of the N* phase.

In the process according to the invention the ferroelectric liquid crystal is in contact with an alignment layer while it is in the temperature region of the nematic phase, and is only then cooled to a temperature region of a phase which resides in a lower temperature region than the N* phase.

In a preferred embodiment the ferroelectric liquid crystal is filled into a liquid crystal cell, i.e., the display, while it is in the isotropic state or at a temperature where it shows a N* phase. It is thus brought into contact with the alignment while it is at a temperature where it is in the isotropic state or forms a N* phase. If the ferroelectric liquid crystal is filled into the cell, i.e., the display while it is in the isotropic state it is subsequently cooled to the temperature region of the N* phase and then to a temperature region of a phase which resides in a lower temperature region than the N* phase.

In a further preferred embodiment the ferroelectric liquid crystal is first filled into a cell, i.e., into the display device, and subsequently heated to the isotropic state or to a temperature where it forms a N* phase and then cooled to a temperature region of a phase which resides in a lower temperature region than the N* phase.

Examples of the phase which reside in the lower temperature region than the N* phase include SmA, SmC*, SmI*, SmH*, SmB, SmE and crystal phases. By cooling the liquid crystal to such a phase, nuclei of defects such as disclination lines formed by spacers or roughness in the N* phase can be destroyed. By heating the liquid crystal to the N* phase again in the next step, the defects can be corrected to give a uniform and defect-free alignment since there exist no nuclei. In the process of the present invention, it is preferable to heat the liquid crystal to the temperature region of an N* phase which is free from any twist and in which the liquid crystal is aligned horizontally (homogeneous alignment).

From another aspect, the present invention provides a process for producing a ferroelectric liquid crystal display device containing a ferroelectric liquid crystal showing at least an N* phase and an SmC* phase and an organic polymer film or an oblique vapor-deposition film of an inorganic substance serving as an alignment layer and being aligned horizontally, characterized by aligning the liquid crystal by applying an electric field thereto in the N* phase. As the electric field to be applied, use can be made of those having various wave patterns such as a triangular wave, a sine wave, a rectangular wave, a pulse wave, etc. By applying such an electric field in the N* phase, disclination lines and defects caused thereby can be eliminated and thus a uniform alignment can be obtained. It is believed that this is because triggers for the formation of disclination lines can be exterminated by eliminating spacers and roughness which cause disclination lines and defects.

In the process of the present invention, it is still preferable to use an aligning method which comprises a combination of the above-mentioned heating/cooling treatment and the treatment of applying an electric field.

By aligning the liquid crystal in accordance with the process of the present invention, a uniform alignment can be obtained compared with the conventional method wherein the liquid crystal is gradually cooled after filling. Moreover, it is not necessary in the process of the present invention to gradually cool the liquid crystal, which makes it possible to shorten the time required for alignment.

Additional objects, advantages and features of the various aspects of the present invention will become apparent from the following description of its preferred embodiments, such description being given in conjunction with the accompanying drawings.

BRIEF DESCRIPTION OF THE DRAWINGS

FIGS. 7a–7c photographs showing a liquid crystal which is aligned in accordance with the process of the present invention.

FIGS. 8a–8c photographs showing a liquid crystal which is aligned in accordance with the process of the present invention.

The present invention is further described and illustrated in the following examples. Further objects of this invention, together with additional features contributing thereto and advantages accruing therefrom, will be apparent from the following examples of the invention. It will be appreciated that variations and modifications in the embodiments described can be made by the skilled person without departing from the spirit or scope of the invention as defined in the appended claims.

EXAMPLE 1

SiO powder was introduced into a tantalic boat, which had pinholes and a lid, and subjected to electric resistance heating to form an SiO oblique vapor-deposition film with a film thickness of 800 Å on a glass substrate having provided thereon an indium/tin oxide (ITO) layer. In the vapor-deposition step, the degree of vacuum and the vapor-deposition rate were respectively $1 \times 10^{-5}$ torr and 7 Å/sec.

The SiO oblique vapor-deposition substrates thus treated were heated in an oven at 350° C. for 1 hour. Then these substrates were assembled into a cell in such a manner as to make the vapor-deposition directions parallel to each other with a cell gap of 1.5 μm. A ferroelectric liquid crystal composition A having the following composition was filled into the cell in the isotropic phase in a vacuum oven.

Composition of ferroelectric liquid crystal composition A:

$C_8H_{17}$—[pyrimidine]—[phenyl]—$OC_8H_{17}$   16.4 wt%

$C_8H_{17}O$—[pyrimidine]—[phenyl]—$OC_8H_{17}$   5.5

$C_8H_{17}$—[pyrimidine]—[phenyl]—$OC_{10}H_{21}$   13.0

$C_8H_{17}O$—[pyrimidine]—[phenyl]—$OC_6H_{17}$   11.1

$C_8H_{17}O$—[pyrimidine]—[phenyl]—$OC_4H_9$   10.8

$C_8H_{17}O$—[pyrimidine]—[phenyl]—$OC_{10}H_{21}$   10.7

$C_8H_{17}$—[pyrimidine]—[phenyl]—$OC_6H_{13}$   17.0

$C_{10}H_{21}O$—[pyrimidine]—[phenyl]—[cyclohexyl]   8.0

$C_8H_{17}$—[pyrimidine]—[phenyl]—$OCH_2$—[epoxide]—$C_4H_9$   1.5

-continued

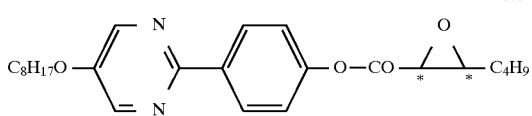

6.0

Characteristics of ferroelectric liquid crystal composition A:
Phase transition temperature:

Cryst 1 Sc 64 Sa 71 N 84 I

Spontaneous Polarization: $Ps=14$ $nC$ $cm^{-2}$ ($25°$ C.).

Figure 1A:
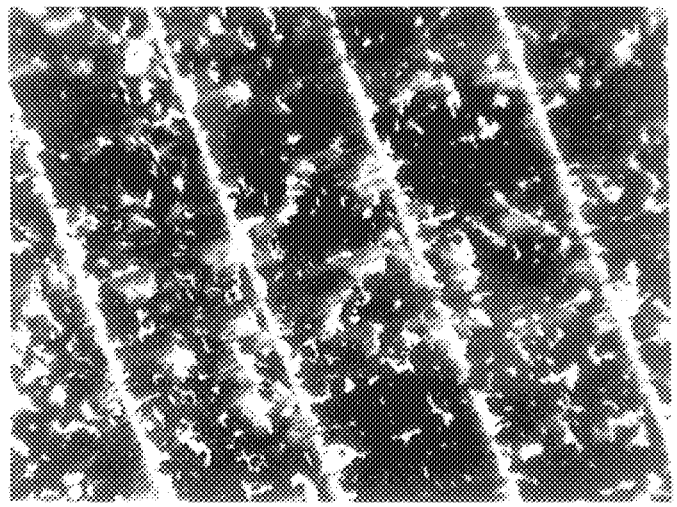
FIGS. 1a–1c are photographs showing a liquid crystal which is aligned in accordance with the process of the present invention.
Figure 1B:
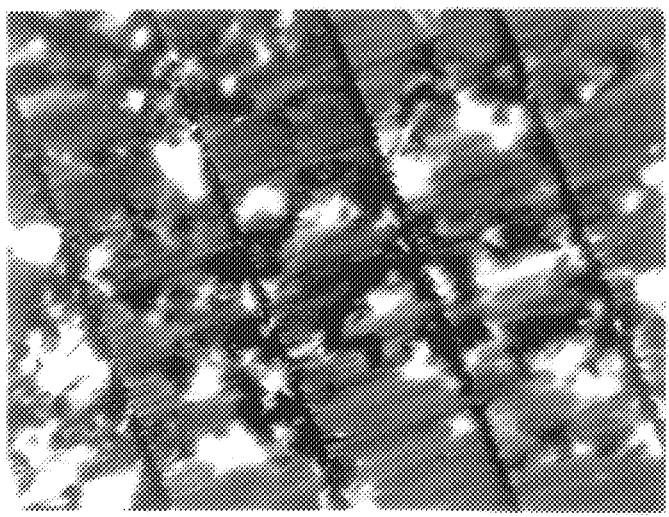
Figure 1C:
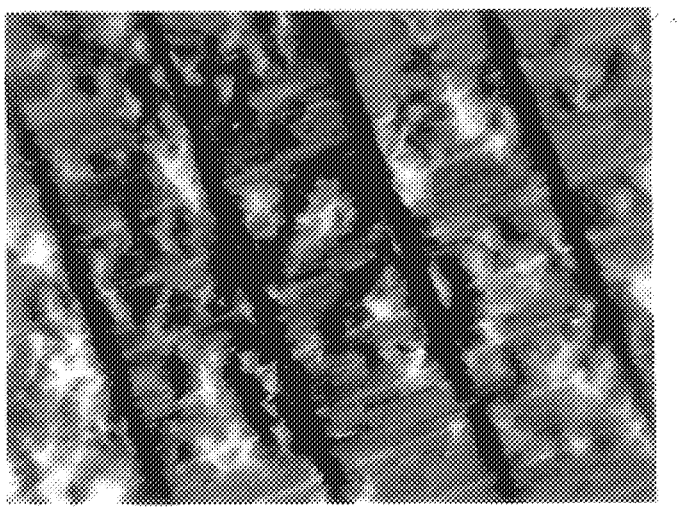
Figure 2D:
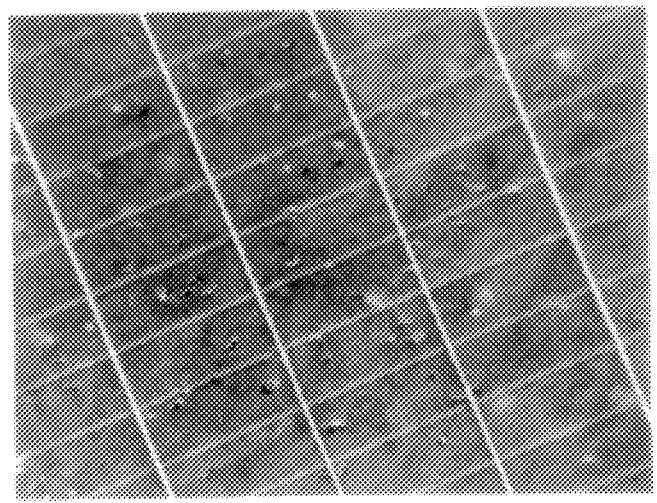
FIGS. 2d–2f photographs showing a liquid crystal which is aligned in accordance with the process of the present invention.
Figure 2E:
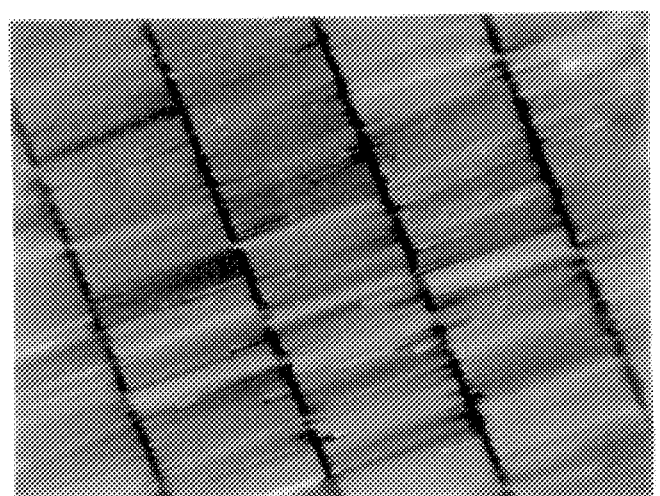
Figure 2F:
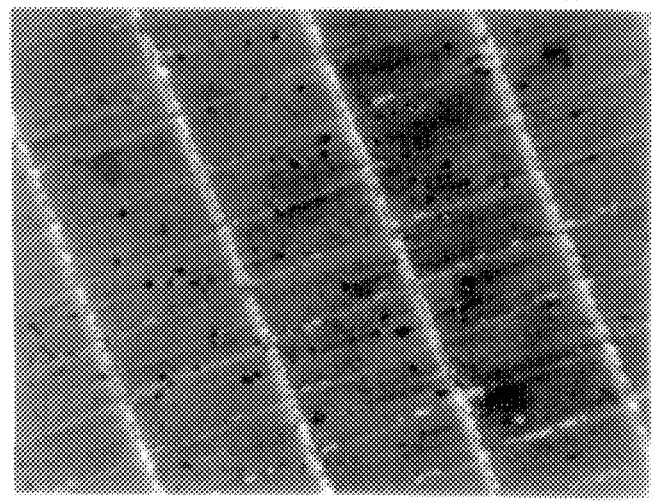

When the liquid crystal cell thus prepared was cooled to 27° C. (the SmC* phase), a number of defects including focal conic were observed as shown in FIG. 1-a. When the cell was heated to the N* phase (72° C.), the defects observed in the SmC* phase (FIG. 1-a) and SmA phase (FIGS. 1-b and 1-c) disappeared and a uniform alignment was obtained (FIG. 2-d). When the cell was cooled to room temperature (27° C.) as such, a defect-free homogeneous alignment of the SmA phase (FIG. 2-e) and the SmC* phase (FIG. 2-f) was obtained. In this process, gradual cooling was not required in any of the cooling steps.

EXAMPLE 2

Figure 3A:
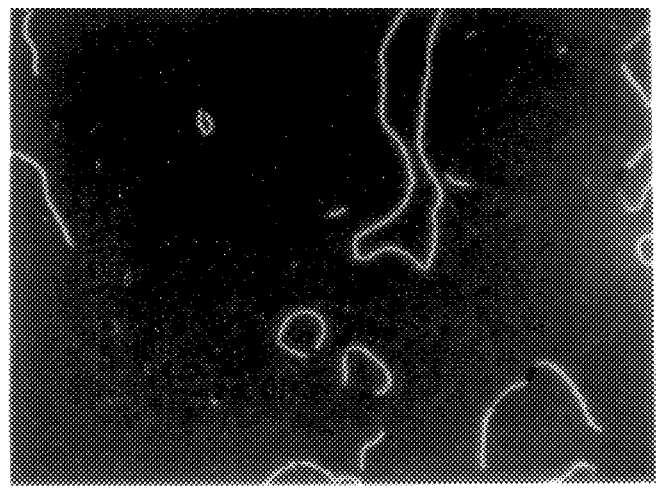
FIGS. 3a–3c photographs showing a liquid crystal which is aligned in accordance with the process of the present invention.
Figure 3B:
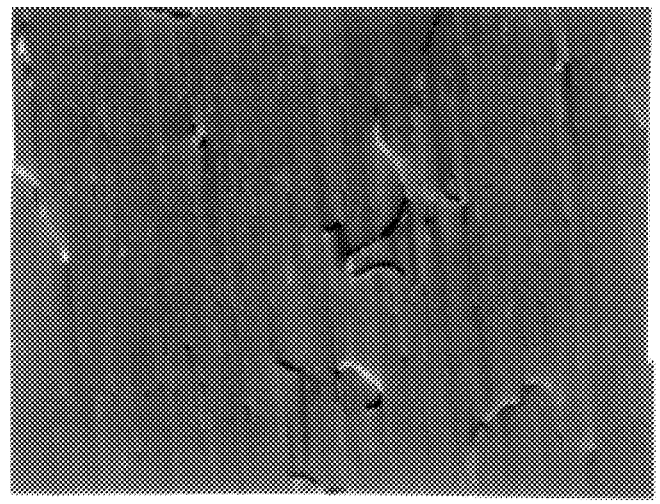
Figure 3C:
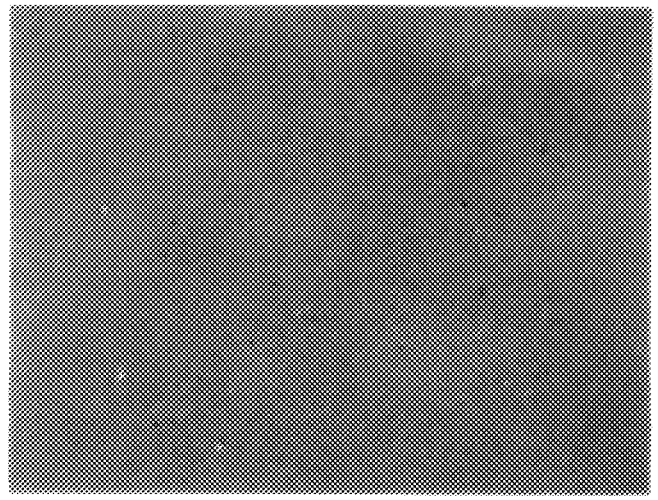

An SiO oblique vapor-deposition cell was prepared in the same manner as described in Example 1 and a ferroelectric liquid crystal composition A was filled into the cell in the isotropic phase. Then the cell was cooled from the Iso phase to the N* phase (72° C.) by the conventional gradual cooling method at a rate of 1° C./min. As a result, disclination lines triggered by spacers and protrusions remained therein (FIG. 3-a). After maintaining the cell at this temperature for a while, these disclination lines did not disappear. When the cell was further cooled to the SmA phase (67° C.), the disclination lines observed in the N* phase remained in a deformed state as defects of the SmA phase (FIG. 3-b). Then the cell was heated again to the N* phase (72° C.) in accordance with the process of the present invention. As a result, these defects disappeared and a defect-free and homogeneous alignment was obtained (FIG. 3-c). When this cell was cooled to room temperature as such, no defect appeared.

EXAMPLE 3

Figure 4A:
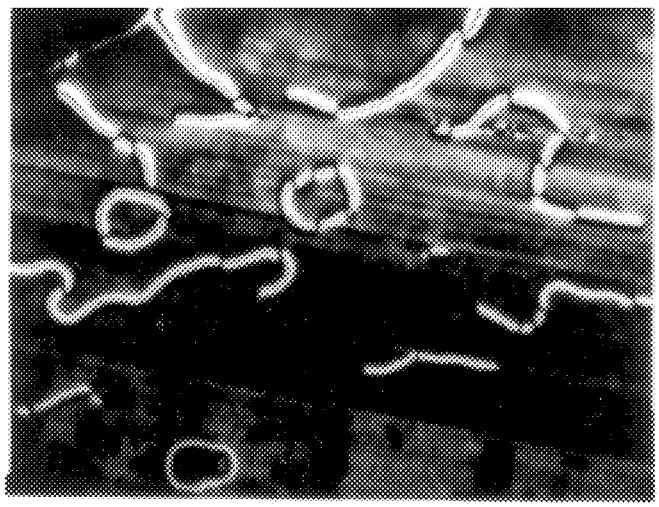
FIGS. 4a–4c photographs showing a liquid crystal which is aligned in accordance with a conventional process.
Figure 4B:
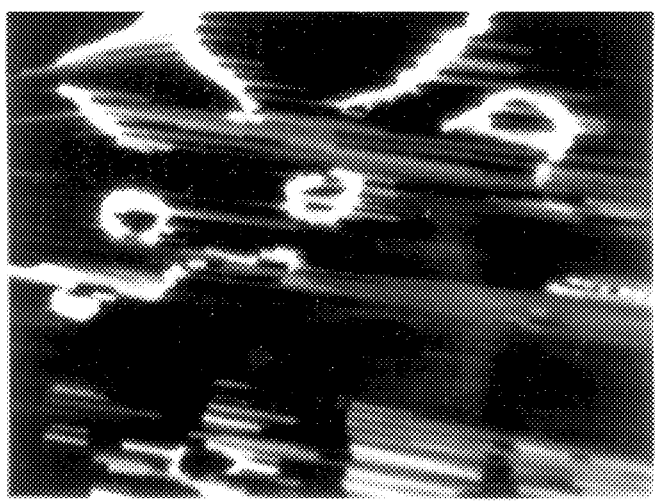
Figure 4C:
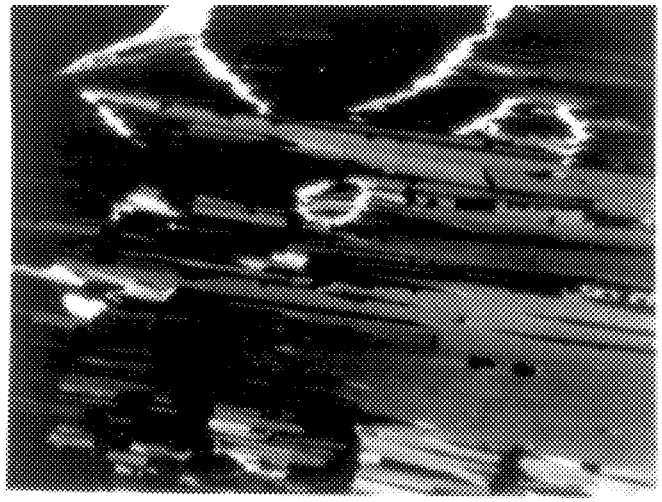

A cell was prepared by the procedure of Example 1 except for using an organic alignment layer as a substitute for the SiO oblique vapor-deposition layer. As the organic alignment layer, POLIX8A manufactured by Hoechst AG was employed. An alignment layer of POLIX8A having a film thickness of 200 Å was formed and subjected to a rubbing treatment to prepare a cell. A ferroelectric liquid crystal composition A was filled into this cell in the isotropic phase, and the cell was gradually cooled at a rate of 1° C./min. As shown in FIG. 4, disclination lines formed in the N* phase during the gradual-cooling process (FIG. 4-a) remained in the SmA phase (FIG. 4-b) and in the SmC* phase (FIG. 4-c).

Figure 5D:
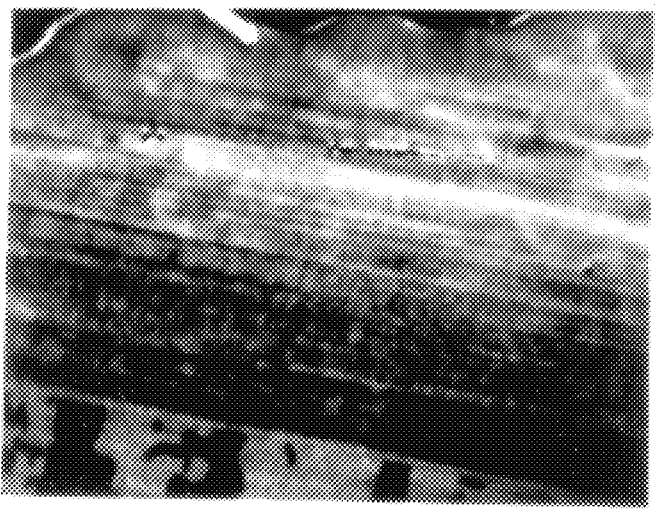
FIGS. 5d–5f photographs showing a liquid crystal which is aligned in accordance with the process of the present invention.
Figure 5E:
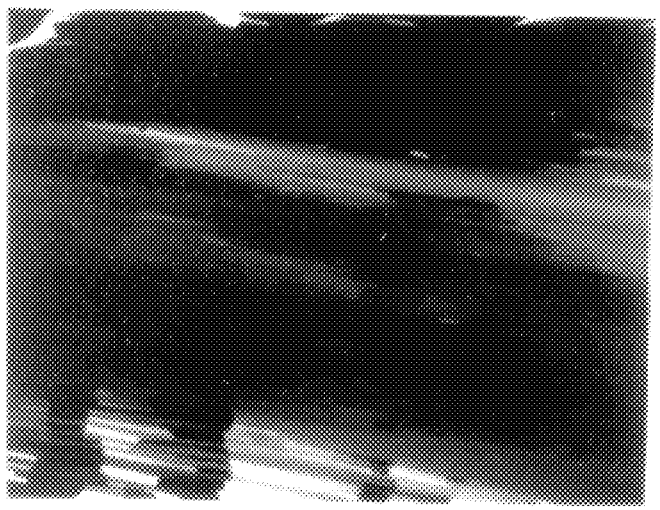
Figure 5F:

When this cell was heated again to the N* phase in a similar way as Example 2, the defects disappeared (FIG. 5-d). A defect-free homogeneous alignment of the SmA phase (FIG. 5-e) and the SmC* phase (FIG. 5-f) was obtained in this cell without using a gradual-cooling process.

EXAMPLE 4

Figure 6A:
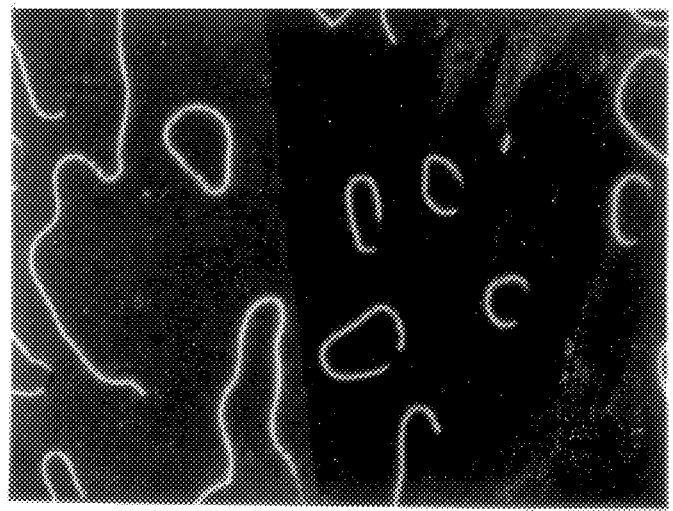
FIGS. 6a–6c photographs showing a liquid crystal which is aligned in accordance with the process of the present invention.
Figure 6B:
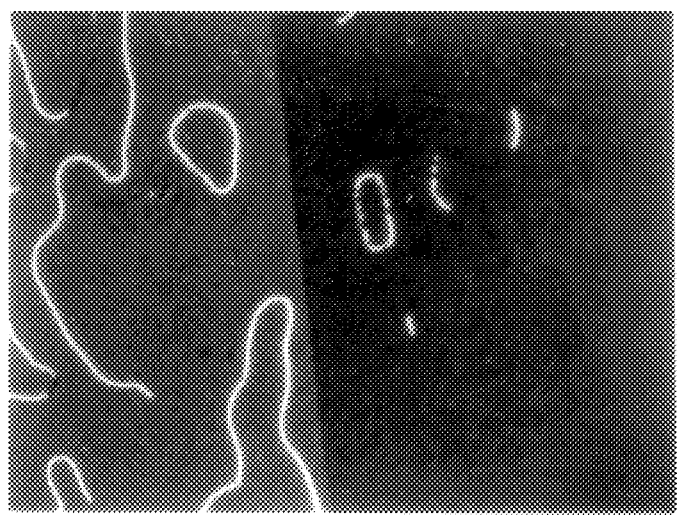
Figure 6C:
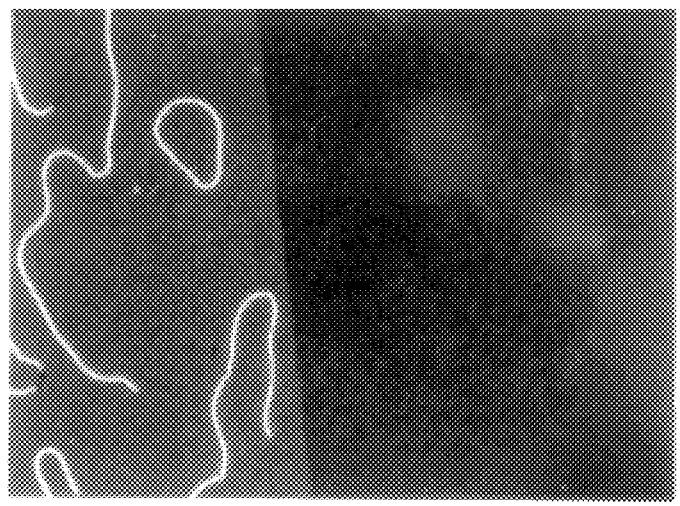
Figure 9:
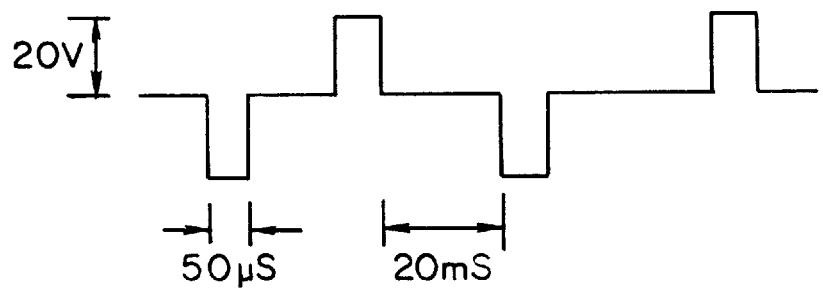
FIG. 9 shows the wave pattern of the pulse wave applied in Example 4.

A cell was prepared in the same manner as the one described in Example 1 except for using a glass plate on which an ITO layer was not provided in the left half side thereof. A ferroelectric liquid crystal composition A was filled into the cell thus prepared in the isotropic phase and then the cell was gradually cooled to the N* phase at a rate of 1° C./min. As shown in FIG. 6-a, many disclination lines were observed in the cell. When a pulse wave as shown in FIG. 9 was applied to the cell, the disclination lines on the electrode provided in the right half side of the cell disappeared with a lapse of time of 1 minute and 3 minutes (FIGS. 6-b and 6-c).

EXAMPLE 5

Figure 7A:
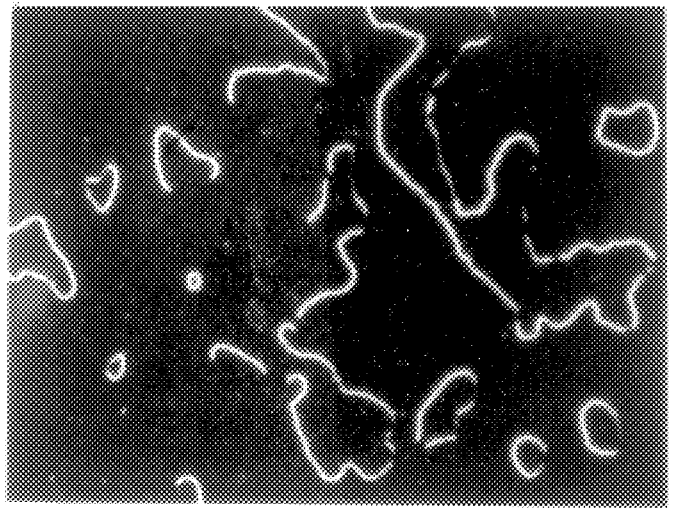
Figure 7B:
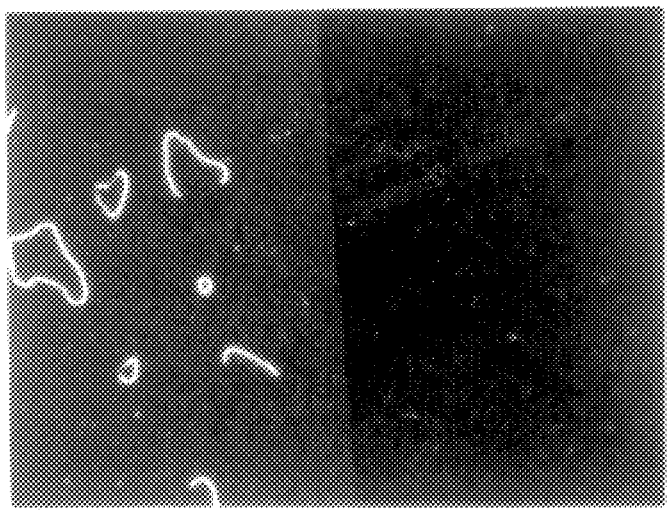

A cell was prepared in the same manner as described in Example 4. Then an electric field was applied to the cell by using a triangular wave (1 KHz, Vpp=24 V) instead of a pulse wave. As shown in FIGS. 7-a and 7-b, the disclination lines existing on the electrode in the N* phase disappeared and a defect-free homogeneous alignment was obtained.

EXAMPLE 6

Figure 8A:
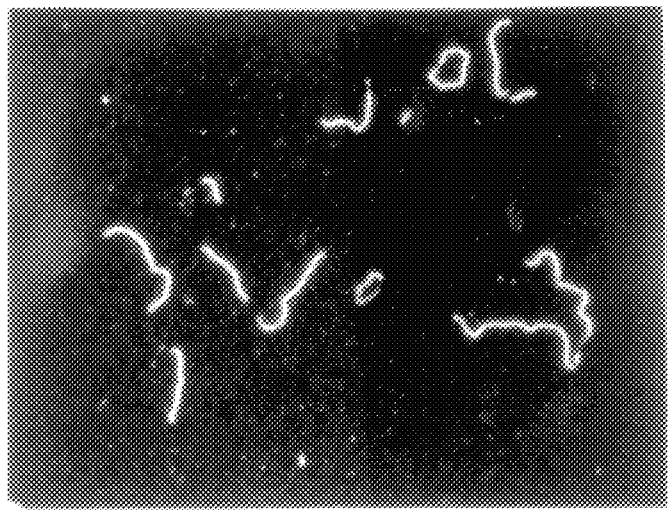
Figure 8B:
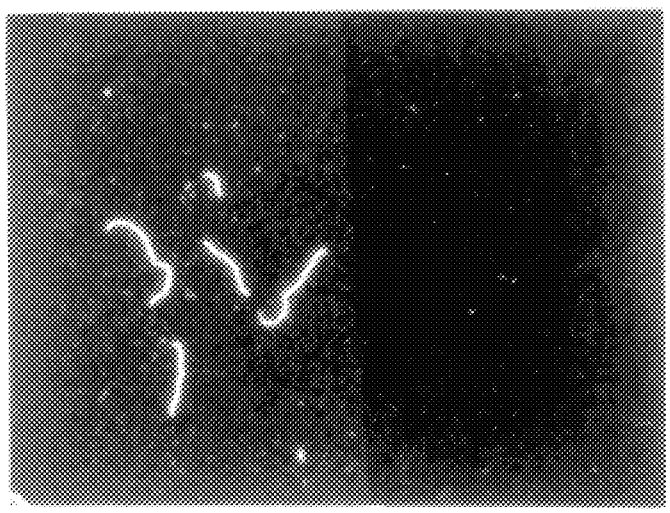

An electric field was applied in the same manner as the one described in Example 4 using a, sine wave (2 kHz, Vpp=24 V) instead of a triangular wave. As shown in FIGS. 8-a, 8-b and 8-c, disclination lines existing on the electrode in the N* phase disappeared and a defect-free homogeneous alignment was obtained.

We claim:

1. A process for producing a ferroelectric liquid crystal display device containing a ferroelectric liquid crystal showing at least an N* phase and an SmC* phase and an organic polymer film or an oblique vapor-deposition film of an inorganic substance serving as an alignment layer, wherein said process comprises aligning the liquid crystal by cooling the liquid crystal once to a temperature region of a phase which resides in a lower temperature region than the N* phase, and then heating the liquid crystal to a temperature region of the N* phase and then cooling the liquid crystal to said SmC* phase.

2. The process according to claim 1, wherein the ferroelectric liquid crystal is filled into the display device while it is in the isotropic state or in the temperature region of the N* phase.

3. The process according to claim 1, wherein the ferroelectric liquid crystal is filled into the display device and is subsequently heated to the isotropic state or to the temperature region of the N* phase and then cooled to a temperature region of a phase which resides in a lower temperature region than the N* phase.

4. The process according to claim 1, further comprising aligning the liquid crystal by applying an electric field in the N* phase.

5. The process according to claim 1, wherein the phase which resides in a lower temperature region than the N* phase is selected from the group consisting of SmA, SmC*, SmI*, SmH*, SmB, SmE and crystal phases.

6. A process for producing a ferroelectric liquid crystal display device containing a ferroelectric liquid crystal showing at least an N* phase and an SmC* phase and an organic polymer film or an oblique vapor-deposition film of an inorganic substance serving as an alignment layer, wherein said process comprises aligning the liquid crystal by cooling the liquid crystal once to a temperature region of a phase which resides in a lower temperature region than the N* phase, and then heating the liquid crystal to a temperature region of the N* phase which is free from any twist and in which the liquid crystal is aligned horizontally and then cooling the liquid crystal to said SmC* phase.

7. The process according to claim 6, wherein the ferroelectric liquid crystal is filled into the display device while it is in the isotropic state or in the temperature region of the N* phase.

8. The process according to claim 6, wherein the ferroelectric liquid crystal is filled into the display device and is subsequently heated to the isotropic state or to the temperature region of the N* phase and then cooled to a temperature region of a phase which resides in a lower temperature region than the N* phase.

9. The process according to claim 6, further comprising aligning the liquid crystal by applying an electric field in the N* phase.

10. The process according to claim 6, wherein the phase which resides in a lower temperature region than the N* phase is selected from the group consisting of SmA, SmC*, SmI*, SmH*, SmB, SmE and crystal phases.

11. A process for producing a ferroelectric liquid crystal display device containing a ferroelectric liquid crystal showing at least an N* phase and an SmC* phase and an organic polymer film or an oblique vapor-deposition film of an inorganic substance serving as an alignment layer, wherein said process comprises aligning the liquid crystal by applying an electric field in the N* phase and then cooling said liquid crystal to said SmC* phase.

12. The process according to claim 11, wherein the electric field has a wave pattern selected from the group consisting of a triangular wave, a sine wave, a rectangular wave and a pulse wave.

* * * * *